United States Patent
Bhat et al.

(10) Patent No.: US 9,723,649 B2
(45) Date of Patent: Aug. 1, 2017

(54) METHOD AND APPARATUS FOR IMPROVING CIRCUIT SWITCHED SERVICE AVAILABILITY TO USER EQUIPMENT

(71) Applicant: Samsung Electronics Co., Ltd., Gyeonggi-do (KR)

(72) Inventors: Bharat Bhat, Bangalore (IN); Anand Biradar, Bangalore (IN); Ananth Kumar Ramasamy, Bangalore (IN)

(73) Assignee: Samsung Electronics Co., Ltd (KR)

(*) Notice: Subject to any disclaimer, the term of this patent is extended or adjusted under 35 U.S.C. 154(b) by 7 days.

(21) Appl. No.: 14/755,527

(22) Filed: Jun. 30, 2015

(65) Prior Publication Data

US 2015/0382396 A1    Dec. 31, 2015

(30) Foreign Application Priority Data

Jun. 30, 2014   (IN) .......................... 3199/CHE/2014
Jan. 28, 2015   (IN) .......................... 3199/CHE/2014

(51) Int. Cl.
| | | |
|---|---|---|
| H04W 4/00 | (2009.01) | |
| H04W 76/02 | (2009.01) | |
| H04W 60/00 | (2009.01) | |
| H04W 76/06 | (2009.01) | |

(52) U.S. Cl.
CPC .......... H04W 76/028 (2013.01); *H04W 60/00* (2013.01); *H04W 76/026* (2013.01); *H04W 76/064* (2013.01); *H04W 76/068* (2013.01)

(58) Field of Classification Search
None
See application file for complete search history.

(56) References Cited

U.S. PATENT DOCUMENTS

| | | | |
|---|---|---|---|
| 8,159,980 B2 * | 4/2012 | Jappila .................. | H04W 36/12 370/310 |
| 8,565,221 B2 | 10/2013 | Kodali et al. | |
| 2008/0076425 A1 * | 3/2008 | Khetawat .............. | H04W 88/12 455/436 |
| 2010/0075658 A1 * | 3/2010 | Hou ....................... | H04W 48/02 455/422.1 |
| 2013/0070728 A1 * | 3/2013 | Umatt ............... | H04W 36/0022 370/331 |
| 2014/0204838 A1 * | 7/2014 | Kubota ................. | H04W 74/02 370/328 |
| 2016/0073314 A1 * | 3/2016 | Yang .................... | H04W 36/245 370/331 |

* cited by examiner

*Primary Examiner* — Brandon Renner
(74) *Attorney, Agent, or Firm* — The Farrell Law Firm, P.C.

(57) ABSTRACT

A method and an apparatus are provided for improving availability of a circuit switched (CS) service to a user equipment (UE). The UE sends at least one location area update (LAU) message, to a core network (CN), to initiate an LAU procedure. A release of a CS signaling connection between the UE and the CN is detected due to a failure in the LAU procedure. An ongoing PS signaling connection between the UE and the CN is identified, when the CS signaling connection between the UE and the CN is released. The ongoing PS signaling connection is released. A public land mobile network (PLMN) is selected for obtaining CS services from the core network, when the ongoing PS signaling connection is released.

12 Claims, 6 Drawing Sheets

METHOD AND APPARATUS FOR IMPROVING CIRCUIT SWITCHED SERVICE AVAILABILITY TO USER EQUIPMENT

PRIORITY

This application claims priority under 35 U.S.C. §119(a) to an Indian Provisional Patent Application filed on Jun. 30, 2014 and assigned Serial No. 3199/CHE/2014, and under 35 U.S.C. §119(a) to an Indian Complete Patent Application filed on Jan. 28, 2015 and assigned Serial No. 3199/CHE/ 2014, the contents of which are incorporated herein by reference.

BACKGROUND

1. Field of the Disclosure

The present disclosure relates generally to wireless networks, and more particularly, to a method of improving the availability of circuit switched services to a user equipment (UE) during abnormal scenarios.

2. Description of the Related Art

The third generation partnership project (3GPP) has developed universal mobile telecommunications system (UMTS) to meet the growing demands of mobile and Internet applications. As shown in FIG. 1, a UMTS network architecture 100 includes a UE 102, and a public land mobile network (PLMN), which is divided into a core network (CN) 106 and a radio access network (RAN) 104. The CN 106 is subdivided into a circuit switched (CS) service domain and a packet switched (PS) service domain. The UE 102 is configured to provide both CS and PS services. The CS service domain supports circuit switched services, such as, for example, voice, text etc. The PS service domain supports packet or Internet-based services, such as, for example, streaming movies, voice over Internet protocol (VOIP) calls, video calls, and the like, in the form of data packets. The RAN 104 may be embodied as a UMTS terrestrial RAN (UTRAN). The UE 102 communicates with the UTRAN 104 network using a radio resource connection (RRC). Only one RRC connection can be established between the UE 102 and the core network (CN) 106 at a time. In UMTS, the CS service domain includes a mobile switching center (MSC), for managing voice-based services, and a visited location register (VLR) database, for storing a location of the UE 102 within a serving network. The PS service domain includes a serving general packet radio service (GPRS) support node (SGSN) for handling several mobility and routing dependent functions that are required for PS-based services. The CN 106 also includes a home location register (HLR) where all PS location information, CS location information, and subscriber-related information are stored. The UE 102 and the UTRAN 104 communicate via a $U_U$ interface, whereas the UTRAN 104 and CN 106 communicate via a $I_U$ interface.

The UE performs a location area update (LAU), which is a regular procedure for informing the core network of the current location of the UE. The UE also performs an LAU in response to any of the conditions specified in technical specification (TS) 24.008, section 4.4.1. However, the LAU procedure may fail due to one or more conditions, such as, for example, location update reject with cause #17 network failure for maximum attempts, poor signaling connection with the network, random access failure, radio resource (RR) connection failure, T3210 timeout etc., as described in TS 24.008 section 4.4.4.9. One such scenario in which the LAU procedure fails is illustrated in FIG. 2.

Referring to FIG. 2, it is assumed that radio access bearers (RABs) are established between a UE 202, a UTRAN 204, and a MSC 206 of a CS domain and an SGSN 208 of PS domain of the core network, and a radio access bearer is established between the UE 202 and the UTRAN 204 at step 212. The UE 202 establishes a PS signaling connection 210 with the network (PMM_connected) at step 214. As shown in FIG. 2, the UE 202 encounters a trigger due to TS 24.008 section 4.4.1 at step 216, and sends a CS registration request using a location area update request (LAU_REQ) to the MSC 206 of the core network at step 218A. However, the UE 202 cannot avail itself of the services from the CN and the LAU has failed. The UE 202 waits for a time interval, which is specified by a timer T3211, to resend the LAU request to the MSC 206. However, the UE 202 is only permitted to resend the LAU request a maximum of 'n' times. The value 'n' depends on the latest versions of the 3GPP 24.008 specifications. (steps 218A-218N and steps 220A-220N) Upon the $n^{th}$ attempt to resend the LAU request, the RR connection or CS signaling connection between the UE 202 and the MSC 206 of the CN is released at step 222. When the CS signaling connection is released, the UE 202 fails to establish a voice call. Under this scenario, the UE 202 is permitted to perform PLMN selection to avail itself of the CS services from the selected PLMN network. However, it is not possible for the UE 202 to perform PLMN selection since only the CS connection was released and the PS signaling connection remains ongoing with the SGSN 208 of the CN. Therefore, the UE 202 cannot avail itself of CS services as long as the PS signaling connection is maintained by the PS core network.

SUMMARY

The embodiments described herein have been made to address at least the above problems and/or disadvantages and to provide at least the advantages described below. Accordingly, an aspect of the embodiments provides a method for improving the availability of CS services to a UE during abnormal scenarios.

In an embodiment disclosed herein, a method is provided for improving availability of a CS service to a UE. The UE sends at least one LAU message, to a CN, to initiate an LAU procedure. A release of a CS signaling connection between the UE and the CN is detected due to a failure in the LAU procedure. An ongoing PS signaling connection between the UE and the CN is identified, when the CS signaling connection between the UE and the CN is released. The ongoing PS signaling connection is released. A PLMN is selected for obtaining CS services from the core network, when the ongoing PS signaling connection is released.

BRIEF DESCRIPTION OF THE DRAWINGS

The above and other aspects, features, and advantages of the embodiments here will be more apparent from the following description when taken in conjunction with the accompanying drawings in which.

DETAILED DESCRIPTION

Figure 1:
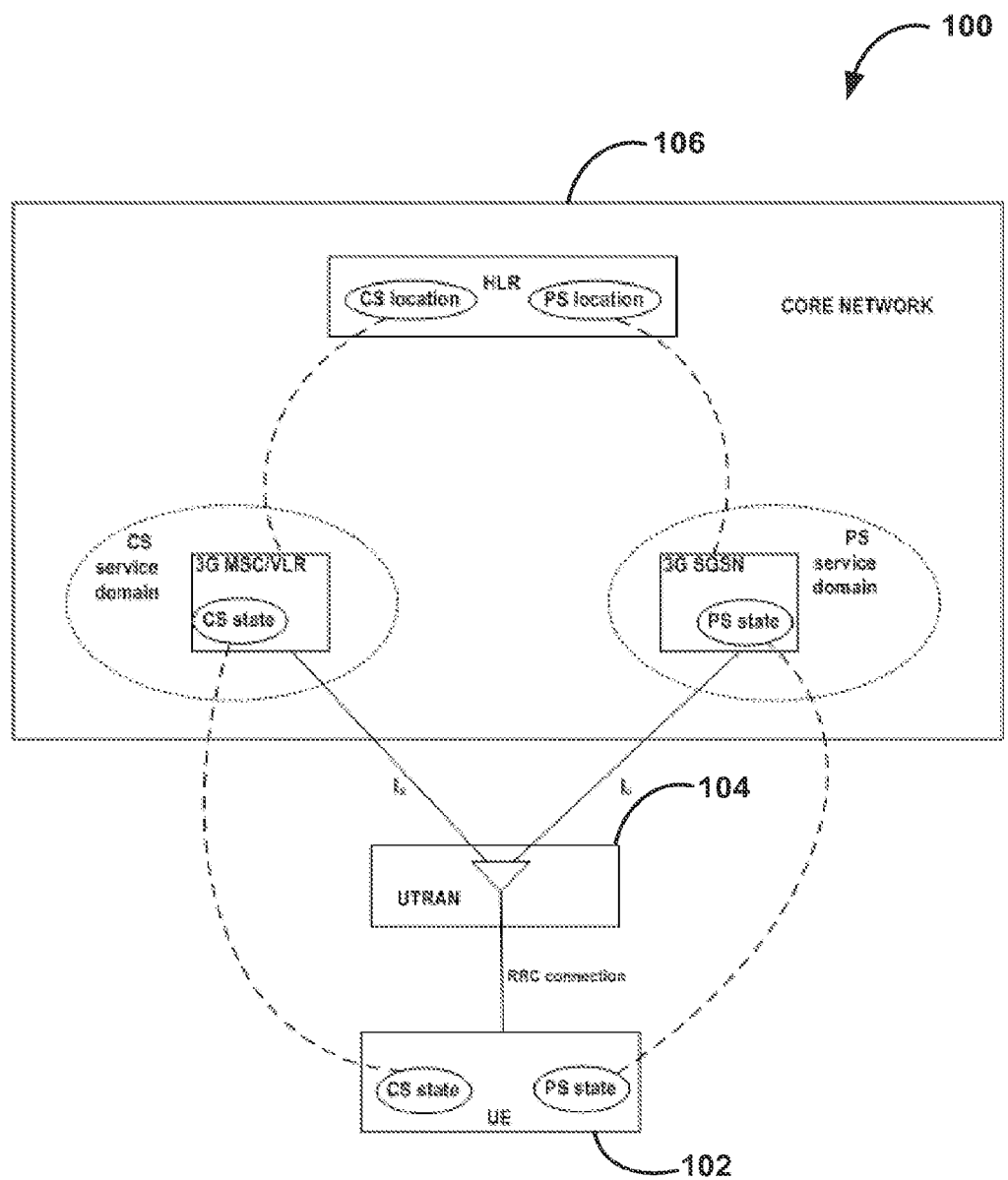
FIG. 1 is a diagram illustrating UMTS network architecture with signaling connections in the UMTS network.

Embodiments are described in detail herein with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The disclosure may refer to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, and/or components, but do not preclude the presence of one or more additional features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meanings as those commonly understood by one of ordinary skill in the art to which this disclosure pertains. It is further understood that terms, such as those defined in commonly used dictionaries, should be interpreted as having meanings that are consistent with their meanings in the context of the relevant art, and should not be interpreted in an idealized or overly formal sense unless expressly so defined herein.

Figure 2:
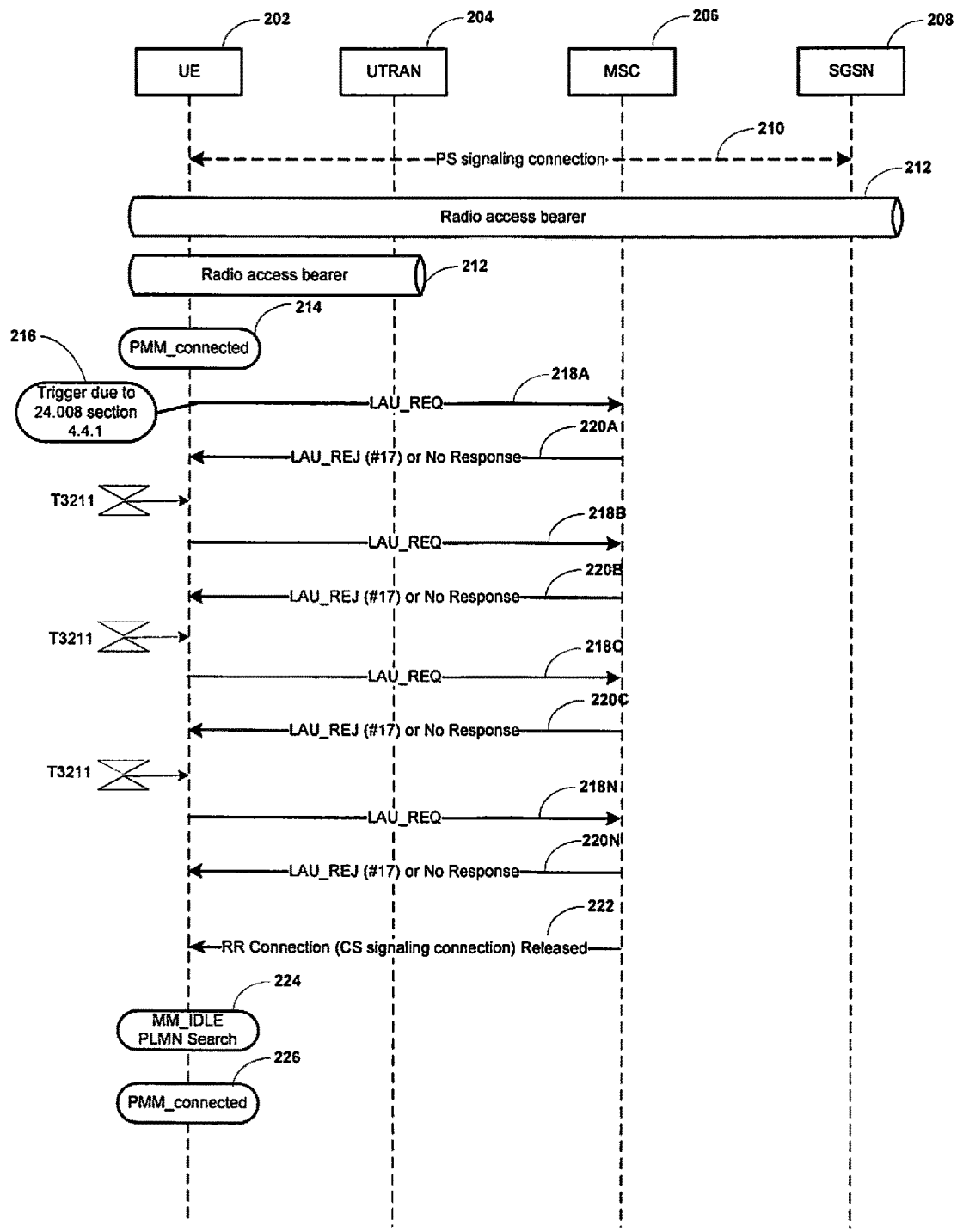
FIG. 2 is a diagram illustrating a problem scenario in which a UE fails to perform an LAU procedure with a core network.
Figure 3:
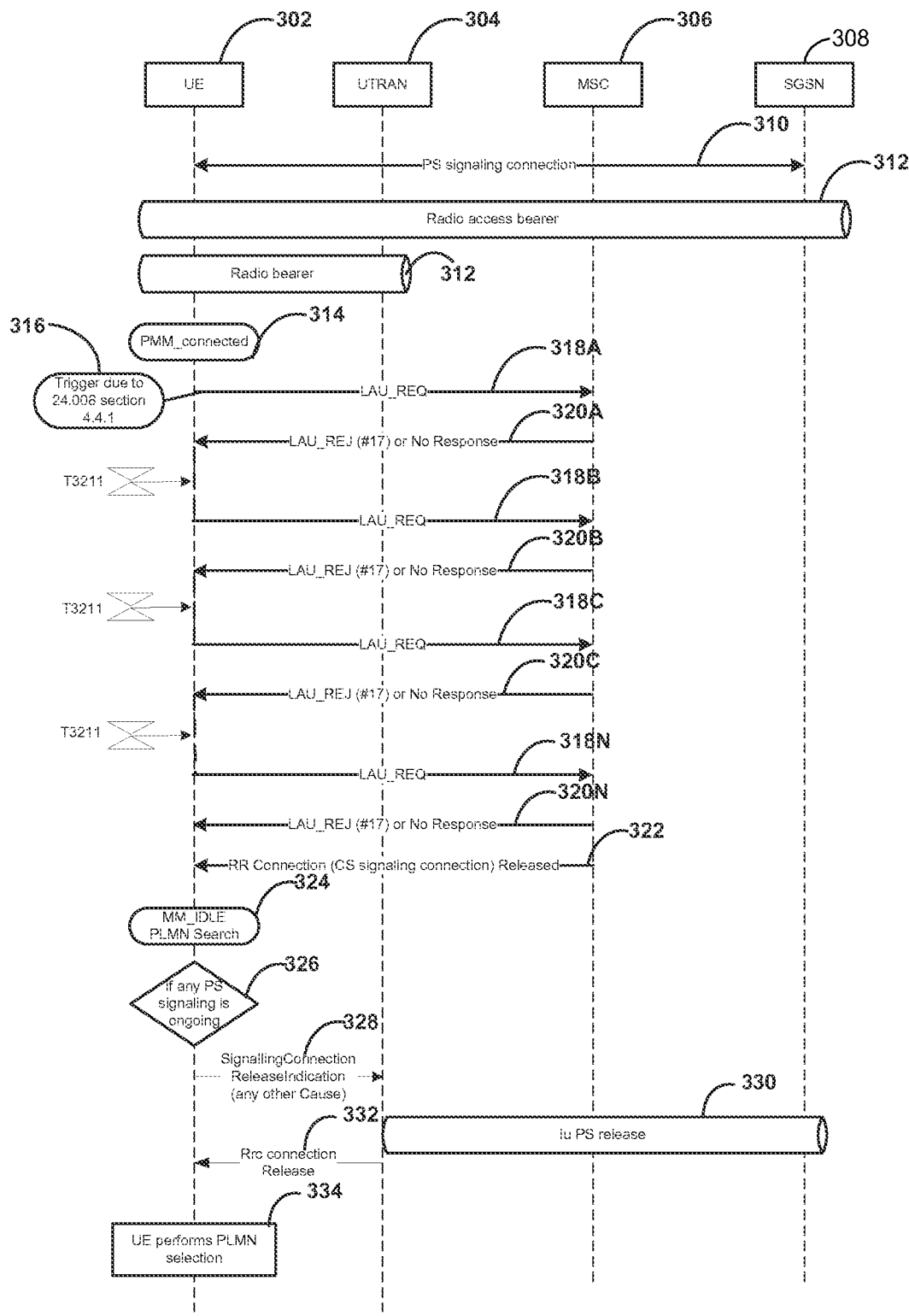
FIG. 3 is a flow diagram illustrating an LAU procedure performed by UE, according to an embodiment of the present disclosure.

FIG. 3 is a flow diagram illustrating an LAU update procedure performed by a UE, according to an embodiment of the present disclosure. The flow diagram of FIG. 3 provides a solution to the problem scenario illustrated in FIG. 2. The UE 302 establishes a PS signaling connection with the network SGSN 308 at step 310. The radio access bearers (RABs) are established between a UE 302, a UTRAN 304, and a MSC 306 of a CS domain and an SGSN 308 of PS domain of the core network, and a radio access bearer is established between the UE 302 and the UTRAN 304 at step 312. As shown in FIG. 3, the UE 302 encounters a trigger due to TS 24.008 section 4.4.1 at step 316, and sends a CS registration request using a location area update request (LAU_REQ) to the MSC 306 of the core network at step 318A. The MSC 306 sends a LAU_REJ (#17) or No Response to the UE 302 that the LAU has failed and the UE 302 cannot avail itself of the services from the CN at step 320A. The UE 302 waits for a time interval, which is specified by a timer T3211, to resend the LAU request to the MSC 306. However, the UE 302 is only permitted to resend the LAU request a maximum of 'n' times. The value 'n' depends on the latest versions of the 3GPP 24.008 specifications. (Steps 318A-318N and steps 320A-320N).

When a UE 302 fails to initiate an LAU procedure due to any of the abnormal scenarios described in section 4.4.4.9 of TS 24.008, the UE 302 performs a PLMN search at step 324 to avail itself of CS services from an MSC 306 of the CN at step 322. However, before performing the PLMN search, the UE 306 determines whether there is an ongoing PS connection with SGSN 308 of the CN at step 326. If a PS connection is ongoing, the UE 302 sends a PS signaling connection release indication request to a RAN or UTRAN 304 at step 328. In response to the request, the RAN 304 releases the ongoing PS connection at step 330, and sends an RRC connection release indication to the UE 302 at step 332. Upon receiving the RRC connection release indication, the UE 302 performs the PLMN search to avail itself of CS services from the MSC 306 of the CN at step 334.

Figure 4:
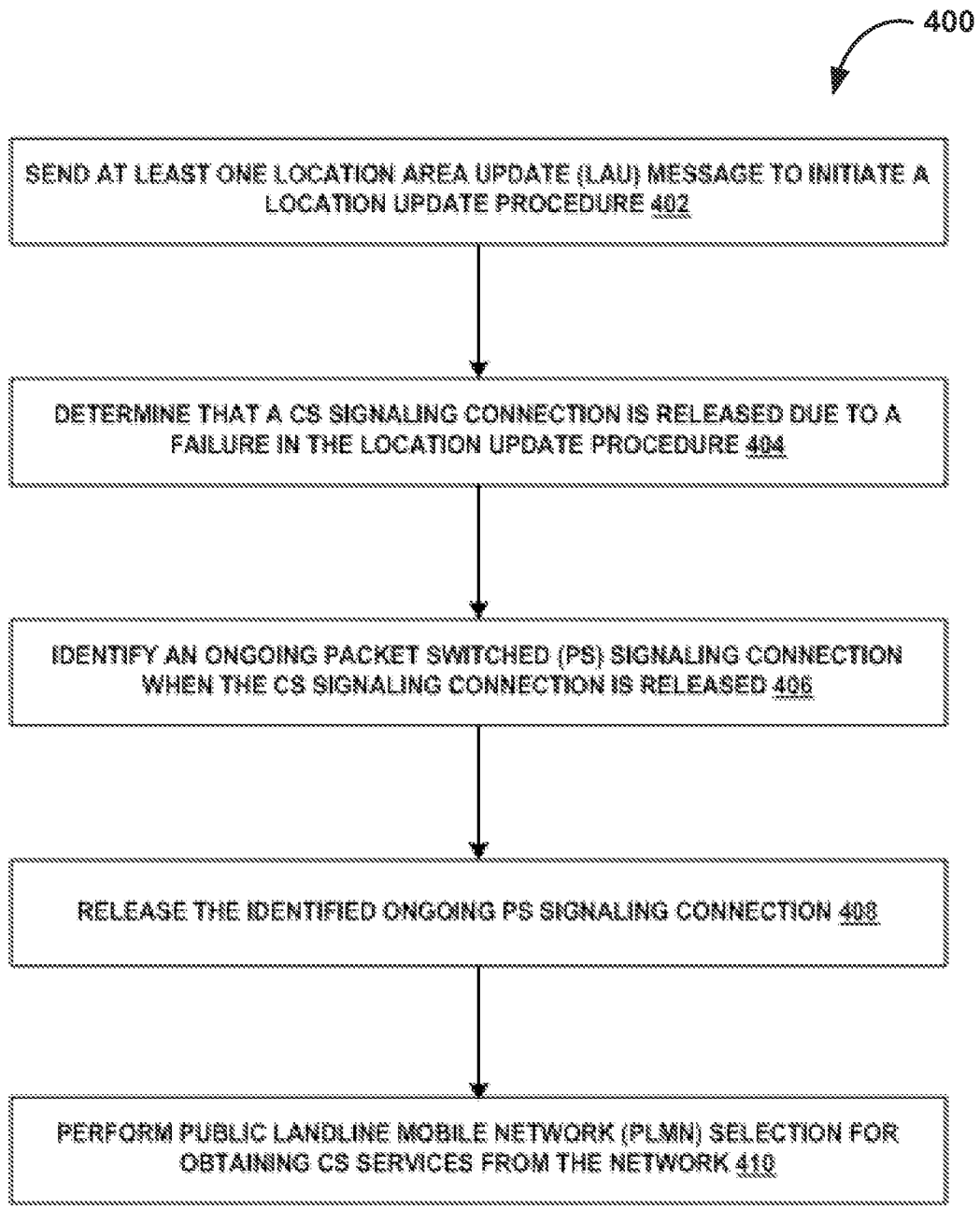
FIG. 4 is a process flowchart illustrating a method of improving CS service availability to the UE during abnormal cases, according to an embodiment of the present disclosure.

FIG. 4 is a flowchart 400 illustrating a method of improving CS service availability to a UE during abnormal cases, according to an embodiment of the present disclosure. In step 402, at least one LAU message is sent, from the UE to the CN, to initiate an LAU procedure. The LAU message is generally sent by the UE to indicate a current location of the UE to the network so as to obtain one or more services from the network. The one or more services may include a CS service (e.g., a voice call service), a PS service (e.g., a video call, a VOIP call), etc. In order to avail itself of these services, the UE updates its location periodically as defined in TS 24.008 section 4.4.1. Upon performing a successful LAU procedure, the UE avails itself of both CS and PS services from the network. The location area information associated with the UE is maintained in a VLR of the core network.

However, in some cases the LAU procedure fails due to abnormal scenarios that happen at the UE. The abnormal scenarios, as described in TS 24.008 section 4.4.4.9 include: access barred because of access class control, answer to random access is an immediate assignment reject message, random access failure, RR connection failure, expiry of T3210 timer, RR connection release before end of normal procedure, location update reject by the network, and location update failed procedurally. When any of these scenarios occur, the UE cannot provide an update on the location area to the network, and hence, the CS signaling connection is released. In step 404, it is determined that the CS signaling connection is released due to a failure in the LAU procedure. In step 406, an ongoing PS signaling connection is identified by the UE, when the CS signaling connection is released. In step 408, the identified ongoing PS signaling connection is released by the UE. In step 410, PLMN selection is performed for obtaining CS services from the network in response to releasing the identified PS signaling connection.

Therefore, for all the cases where mobility management (MM) is in a PLMN_SEARCH sub state and GPRS MM (GMM) is in packet mobility management (PMM)_CONNECTED functional state, the UE can initiate PS signaling connection release and perform PLMN selection. In other words, whenever the UE desires to perform PLMN selection while there is an ongoing PS signaling connection, the UE always releases the PS signaling connection and then performs PLMN selection in order to avail itself of CS services from the network.

Figure 5:
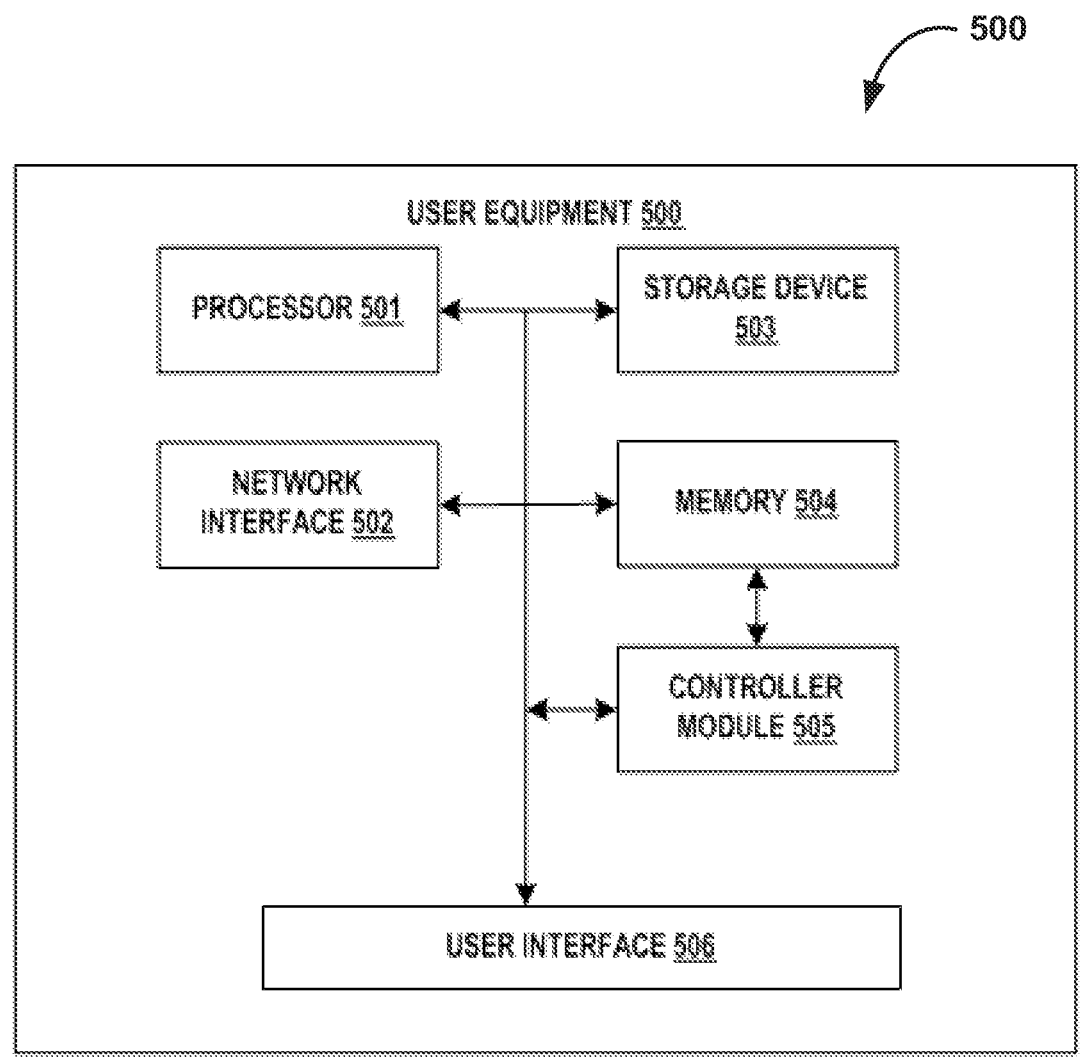
FIG. 5 is a block diagram illustrating one or more components of a UE for availing itself of CS services from the network, according to an embodiment of the present disclosure.

FIG. 5 is a block diagram illustrating one or more components of a UE for availing itself of CS services from the network during abnormal scenarios, according to an embodiment of the present disclosure. A UE 500 may be embodied as a mobile phone, a smart phone, a personal digital assistant (PDA), a tablet, a phablet, a laptop, and the like. The UE 500 is configured to provide CS and PS services.

As shown in FIG. 5, the UE 500 includes one or more processors 501, a storage device 503, a memory 504, and a network interface 502. In addition, the UE 500 includes a user interface 506 and a controller module 505.

The UE may include additional components that are not shown in FIG. 5 for purposes of clarity. For example, the UE 500 may also include a microphone and speaker. The UE 500 may also include a battery that provides power to the components of the UE 500. The UE 500 may also include other user interface components, such as, for example, a keypad, a trackball, a mouse, or other such user interfaces that allow a user to interact with the UE 500. Moreover, the components of the UE 500 that are shown in FIG. 5 may not be necessary in every example of the UE 500.

The processor 501 may be configured to implement functionality and/or process instructions for execution within the UE 500. The processor 501 may be capable of processing instructions stored in the memory 504 or instructions stored on the controller module 505. The processor 501 may include one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor 501 herein may be embodied as software, firmware, hardware, or any combination thereof.

The storage device 503 may include one or more computer-readable storage media. The storage device may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage device 504 may, in some embodiments, be considered a non-transitory computer-readable storage medium. The term "non-transitory" indicates that the storage medium is not embodied in a carrier wave or a propagated signal. However, the term "non-transitory" should not be interpreted to mean that the storage device is non-movable. In some embodiments, the storage device 503 may be configured to store larger amounts of information than the memory 504. In certain embodiments, a non-transitory storage medium may store data that can, over time, change (e.g., in a random access memory (RAM) or cache).

The memory 504 may be configured to store information within the UE 500 during operation. The memory 504 may, in some embodiments, be described as a computer-readable storage medium. The memory may be described as a volatile memory, meaning that the memory 504 does not maintain stored contents when the computer is turned off. Examples of volatile memories include RAMs, dynamic RAMs (DRAMs), static RAMs (SRAMs), and other forms of volatile memories known in the art.

The controller module 505 is configured to maintain state information regarding CS and PS connections of UE, and a status of UE indicating whether it is in an idle state or a mobility state, etc. The controller module 505 is configured to send at least one LAU message to initiate an LAU procedure. The controller module 505 is also configured to determine a release of a CS signaling connection due to a failure in the LAU procedure. The controller module 505 is further configured to identify an ongoing PS signaling connection when the CS signaling connection is released. Additionally, the controller module 505 is configured to release the identified ongoing PS signaling connection and perform a PLMN selection for obtaining CS services from the network.

The UE 500 may utilize the network interface 502 to communicate with external devices via one or more networks, such as, for example, one or more wireless networks. The network interface 502 may be a network interface card, such as, for example, an Ethernet card, an optical transceiver, a radio frequency transceiver, or any other type of device that can send and receive information. Examples of such network interfaces 502 may include Bluetooth®, 3G, and WiFi® radios in mobile electronic devices, as well as USB. Examples of such wireless networks may include WiFi®, Bluetooth®, and 3G. In some embodiments, the UE 500 may utilize the network interface 502 to wirelessly communicate with an external device such as, for example, a server, a mobile phone, or other networked electronic device.

The user interface 506 allows a user of the electronic device to interact with UE 500. The UI 506 may generate a graphical user interface (GUI) that allows a user to initiate commands. In some embodiments, the UI 506 generates a GUI that is displayed on touch sensitive screen (e.g., a touch screen). The GUI may include one or more touch sensitive UI elements. For example, a user may be able to interact with the UE 500 and initiate a command by touching one or more of the touch sensitive UI elements displayed on touch sensitive screen and/or hovering over UI elements displayed on the touch sensitive screen. The touch sensitive screen may comprise of a variety of display devices such as, for example, a liquid crystal display (LCD), an e-ink display, a cathode ray tube (CRT), a plasma display, an organic light emitting diode (OLED) display, or another type of display device.

Figure 6:
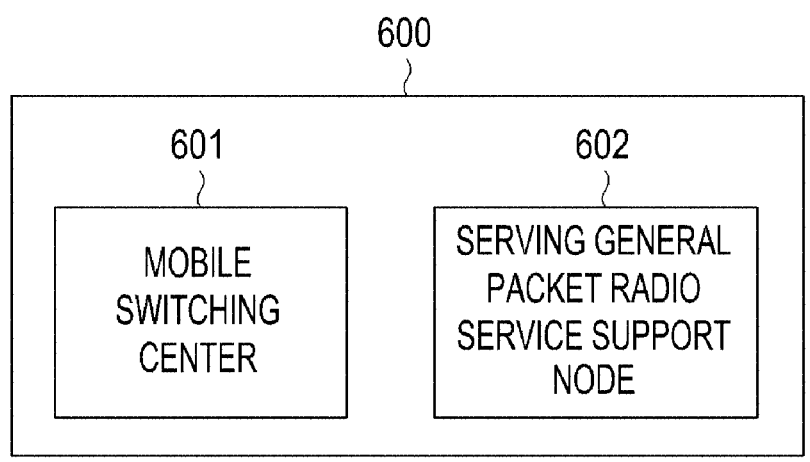
FIG. 6 is a block diagram illustrating one or more components of a core network for improving availability of a CS services to a UE during abnormal scenarios, according to an embodiment of the present disclosure.

FIG. 6 is a block diagram illustrating one or more components of a core network for improving availability of a CS services to a UE during abnormal scenarios, according to an embodiment of the present disclosure.

As shown in FIG. 6, the CN 600 includes a mobile switching center (MSC) 601, a serving general packet radio service (GPRS) support node (SGSN) 602.

The CN may include additional components that are not shown in FIG. 6 for purposes of clarity. For example, the CN 600 may also include a home location register (HLR), a processor, a storage device, memory, and network interface.

The MSC 601 may be configured to release a CS signaling connection between the UE and the CN due to a failure in a location area update (LAU) procedure initiated by the UE.

The SGSN 602 may be configured to receive a request for releasing an ongoing packet switched (PS) signaling connection between the UE and the CN, when the CS signaling connection between the UE and the CN is released, and to release the ongoing PS signaling connection between the UE and the CN.

The MSC 601 and the SGSN 602 may include one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the MSC 601 and the SGSN 602 herein may be embodied as software, firmware, hardware, or any combination thereof.

The various devices, modules, article, and the like described herein may be enabled and operated using hardware circuitry, for example, complementary metal oxide semiconductor (CMOS) based logic circuitry, firmware, software, and/or any combination of hardware, firmware, and/or software embodied in a machine readable medium. For example, the various electrical structure and methods may be embodied using transistors, logic gates, and electrical circuits, such as an application specific integrated circuit. The embodiments may be utilized in conjunction with the manufacture of integrated circuits, chip sets, or system-on-chips (SoCs). While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method of improving availability of a circuit switched (CS) service, the method comprising steps of:
    establishing a packet switched (PS) signaling connection between a user equipment (UE) and a core network (CN);
    sending, by the UE, at least one location area update (LAU) message, to the CN, to initiate an LAU procedure;
    detecting a release of a CS signaling connection between the UE and the CN due to a failure in the LAU procedure;
    identifying the ongoing PS signaling connection between the UE and the CN, when the CS signaling connection between the UE and the CN is released;
    sending, by the UE, a request to the CN for releasing the ongoing PS signaling connection; and
    receiving, by the UE, an indication from the CN indicating release of the ongoing PS signaling connection; and
    when the indication of the release of the ongoing PS signaling connection is received:
        searching public land mobile networks (PLMNs) for a PLMN from which to obtain CS services;
        selecting a PLMN among the searched PLMNs for obtaining CS services from the CN; and
        setting up a CS signaling connection with the selected PLMN to obtain the CS services from the CN.

2. The method as claimed in claim 1, wherein the failure in the LAU procedure is due to an occurrence of an abnormal scenario at the UE.

3. The method as claimed in claim 2, wherein the abnormal scenario at the UE comprises at least one of:
    barring access due to an access class control;
    receiving an immediate assignment reject message from the CN;
    a random access failure;
    a radio resource (RR) connection failure;
    expiry of T3210 timer;
    an RR connection release before an end of a successful LAU procedure;
    receiving a location update rejection from the CN; and
    procedural failure of the LAU procedure.

4. The method as claimed in claim 1, wherein detecting the release of the CS signaling connection between the UE and the CN due to the failure in the LAU procedure comprises:
    receiving a reject message of the LAU procedure; or
    receiving no response for a time interval.

5. A user equipment comprising:
    a controller module; and
    a memory comprising computer-executable instructions that configure the controller module to perform steps comprising:
        establishing a packet switched (PS) signaling connection between a user equipment (UE) and a core network (CN);
        sending at least one location area update (LAU) message, to the CN, to initiate an LAU procedure;
        detecting a release of a CS signaling connection between the UE and the CN due to a failure in the LAU procedure;
        identifying the ongoing PS signaling connection between the UE and the CN, when the CS signaling connection between the UE and the CN is released;
        sending a request to the CN through a UMTS terrestrial radio access network (UTRAN) for releasing the ongoing PS signaling connection;
        receiving an indication from the CN indicating release of the ongoing PS signaling connection; and
        when the indication of the release of the ongoing PS signaling connection is received:
            searching public land mobile networks (PLMNs) for a PLMN from which to obtain CS services;
            selecting a PLMN among the searched PLMNs for obtaining CS services from the CN; and
            setting up a CS signaling connection with the selected PLMN to obtain the CS services from the CN.

6. The user equipment as claimed in claim 5, wherein the failure in the LAU procedure is due to an occurrence of an abnormal scenario at the user equipment.

7. The user equipment as claimed in claim 6, wherein the abnormal scenario at the user equipment comprises at least one of:
    barring access due to an access class control;
    receiving an immediate assignment reject message from the CN;
    a random access failure;
    a radio resource (RR) connection failure;
    expiry of T3210 timer;
    an RR connection release before an end of a successful LAU procedure;
    receiving a location update rejection from the CN; and
    procedural failure of the LAU procedure.

8. The user equipment as claimed in claim 5, wherein detecting the release of the CS signaling connection between the UE and the CN due to the failure in the LAU procedure comprises:
    receiving a reject message of the LAU procedure; or
    receiving no response for a time interval.

9. A system-on-chip for improving availability of a circuit switched (CS) service, the system-on-chip configured to:
    establishing a packet switched (PS) signaling connection between a user equipment (UE) and a core network (CN);
    send at least one location area update (LAU) message, to the CN, to initiate an LAU procedure;
    detect a release of a CS signaling connection between the UE and the CN due to a failure in the LAU procedure;
    identify the ongoing PS signaling connection between the UE and the CN, when the CS signaling connection between the UE and the CN is released;
    send a request to the CN for releasing the ongoing PS signaling connection;
    receive an indication from the CN indicating release of the ongoing PS signaling connection; and
    when the indication of the release of the ongoing PS signaling connection is received:
        searching public land mobile networks (PLMNs) for a PLMN from which to obtain CS services;

selecting a PLMN among the searched PLMNs for obtaining CS services from the CN; and setting up a CS signaling connection with the selected PLMN to obtain the CS services from the CN.

10. The system-on-chip as claimed in claim 9, wherein the failure in the LAU procedure is due to an occurrence of an abnormal scenario at the UE.

11. The system-on-chip as claimed in claim 10, wherein the abnormal scenario at the UE comprises at least one of:

barring access due to an access class control;

receiving an immediate assignment reject message from the CN;

a random access failure;

a radio resource (RR) connection failure;

expiry of T3210 timer;

an RR connection release before an end of a successful LAU procedure;

receiving a location update rejection from the CN; and procedural failure of the LAU procedure.

12. The system-on-chip as claimed in claim 9, wherein detecting the release of the CS signaling connection between the UE and the CN due to the failure in the LAU procedure comprises:

receiving a reject message of the LAU procedure; or receiving no response for a time interval.

* * * * *